(12) United States Patent
Winter (10) Patent No.: US 10,889,154 B2
(45) Date of Patent: Jan. 12, 2021

(54) SPRING DEVICE FOR A MOTOR-VEHICLE WHEEL SUSPENSION

(71) Applicant: VOLKSWAGEN AKTIENGESELLSCHAFT, Wolfsburg (DE)

(72) Inventor: Ingo Winter, Isenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 42 days.

(21) Appl. No.: 16/388,627

(22) Filed: Apr. 18, 2019

(65) Prior Publication Data

US 2019/0241036 A1    Aug. 8, 2019

Related U.S. Application Data

(63) Continuation of application No. PCT/EP2017/071578, filed on Aug. 28, 2017.

(30) Foreign Application Priority Data

Oct. 18, 2016  (DE) .................. 10 2016 220 325

(51) Int. Cl.
  *B60G 3/20* (2006.01)
  *B60G 11/08* (2006.01)
  (Continued)

(52) U.S. Cl.
  CPC .............. *B60G 11/08* (2013.01); *B60G 3/28* (2013.01); *B60G 7/008* (2013.01); *B60G 7/02* (2013.01);
  (Continued)

(58) Field of Classification Search
  CPC .... F16F 1/18; F16F 1/368; B60G 3/26; B60G 3/28; B60G 11/02; B60G 11/08; B60G 11/20; B60G 11/28
  (Continued)

(56) References Cited

U.S. PATENT DOCUMENTS 2,236,522 A    4/1941  Cook
4,650,209 A *  3/1987  Sumimoto ............... B60G 3/22
                                        280/124.109
(Continued)

FOREIGN PATENT DOCUMENTS

DE        344355        9/1920
DE        3243434 A1    5/1984
(Continued)

OTHER PUBLICATIONS

International Search Report dated Nov. 16, 2017 in corresponding application PCT/EP2017/071578.

*Primary Examiner* — Christopher P Schwartz
(74) *Attorney, Agent, or Firm* — Muncy, Geissler, Olds & Lowe, P.C.

(57) ABSTRACT

A spring device for a motor vehicle wheel suspension that includes a first leaf spring made of fiber-reinforced plastic and a second leaf spring made of fiber-reinforced plastic. The second leaf spring is shorter than the first leaf spring and together with the first leaf spring forms a V-shaped structure, which, in the region of the joined ends of the V-shape, has a first fastening device for the vehicle-body-side support and at the free ends of the V shape has a second fastening device on the first leaf spring for wheel-side support and a third fastening device on the second leaf spring for vehicle-body-side support.

12 Claims, 9 Drawing Sheets

(51) Int. Cl.
*B60G 3/28* (2006.01)
*B60G 7/02* (2006.01)
*B60G 7/00* (2006.01)
*B60G 21/05* (2006.01)
*B60G 11/42* (2006.01)
*F16F 1/18* (2006.01)

(52) U.S. Cl.
CPC .............. *B60G 11/42* (2013.01); *B60G 21/05* (2013.01); *F16F 1/18* (2013.01); *B60G 2200/182* (2013.01); *B60G 2202/114* (2013.01); *B60G 2202/143* (2013.01); *B60G 2204/121* (2013.01); *B60G 2204/125* (2013.01); *B60G 2204/82* (2013.01); *B60G 2204/8302* (2013.01); *B60G 2206/428* (2013.01); *B60G 2206/7101* (2013.01); *F16F 2224/0241* (2013.01)

(58) Field of Classification Search
USPC .................. 267/7, 36.1, 38, 40, 47, 52, 260; 280/124.134–124.14, 124.17, 280/124.171–124.175
See application file for complete search history.

(56) References Cited

U.S. PATENT DOCUMENTS

| | | | | |
|---|---|---|---|---|
| 5,000,477 | A * | 3/1991 | Minakawa | B60G 3/202 280/124.136 |
| 7,258,355 | B2 * | 8/2007 | Amano | B60G 3/20 280/124.134 |
| 7,520,517 | B2 * | 4/2009 | Svendsen | B60G 11/04 267/260 |
| 8,727,362 | B2 | 5/2014 | Heimann et al. | |
| 9,657,799 | B2 * | 5/2017 | Spiegel | B60G 11/02 |
| 2015/0183285 | A1 * | 7/2015 | Kettenberger | B60G 7/001 280/124.131 |

FOREIGN PATENT DOCUMENTS

| | | |
|---|---|---|
| DE | 102010022895 A1 | 12/2011 |
| DE | 102011077336 A1 | 12/2012 |
| DE | 102012021290 A1 | 4/2014 |
| DE | 102013209648 A1 | 11/2014 |
| FR | 835878 A | 1/1939 |
| JP | S56131203 U | 10/1981 |
| JP | H058625 A | 1/1993 |

* cited by examiner

SPRING DEVICE FOR A MOTOR-VEHICLE WHEEL SUSPENSION

This nonprovisional application is a continuation of International Application No. PCT/EP2017/071578, which was filed on Aug. 28, 2017, and which claims priority to German Patent Application No. 10 2016 220 325 8, which was filed in Germany on Oct. 18, 2016, and which are both herein incorporated by reference.

BACKGROUND OF THE INVENTION

Field of the Invention

The present invention relates to the field of automotive engineering and here in particular to a spring device for a motor vehicle wheel suspension comprising a first leaf spring made of fiber-reinforced plastic.

Description of the Background Art

A spring device is known from DE 32 43 434 A1 in connection with a rear axle of a motor vehicle. The leaf spring made of fiber-reinforced plastic extends in the manner of a control arm in the vehicle transverse direction to a wheel carrier and is braced on the body side against a stable axle carrier made of metal. Further, the known rear axle comprises a spring strut with a coil spring, which produces the support of the vehicle body.

Furthermore, DE 10 2013 209 648 A1 discloses the use of a curved spring made of fiber-reinforced plastic in a motor vehicle wheel suspension.

The weight of a motor vehicle axle can be reduced due to the use of spring devices made of fiber-reinforced plastic in a wheel suspension for supporting the vehicle body and/or optionally also for the purpose of wheel guidance. If appropriate spring devices are used primarily as transverse leaf springs, therefore, extend predominantly in the vehicle transverse direction, a massive structure must be created in the region of the body-side connection, said structure which adversely affects the weight advantage of the lighter spring device.

SUMMARY OF THE INVENTION

It is therefore an object of the present invention to convert the weight advantage of leaf springs made of fiber-reinforced plastic in a motor vehicle wheel suspension as effectively as possible into a reduction of the total weight of a motor vehicle.

The spring device according to an exemplary embodiment of the invention comprises a first leaf spring made of fiber-reinforced plastic and a second leaf spring made of fiber-reinforced plastic, which is shorter than the first leaf spring and together with the first leaf spring forms a V-shaped structure, which in the region of the joined ends has a first fastening device for vehicle-body-side support and at its free ends has a second fastening device on the first leaf spring for wheel-side support and a third fastening device on the second leaf spring for vehicle-body-side support.

This results in a body-side force introduction via two spaced points, namely, firstly via the free end of the V shape on the second leaf spring and via the region of the joined ends of the V shape or the corresponding end sections of the first and second leaf springs, so that the corresponding body-side structures on the motor vehicle can be formed less massive and thus lighter.

In addition, the arrangement of the spring device of the invention enables an overall height that is lower in relation to the vertical direction of a motor vehicle with a high energy absorption capacity.

The spring device of the invention can replace in a motor vehicle wheel suspension a conventional spring arm with a body spring supported thereon, namely in particular also such that the conventional wheel-side and body-side attachment points are retained.

Thus, the first leaf spring and the second leaf spring can be formed in particular as separate parts, which are clamped together into a V shape. For this purpose, for example, the first fastening device comprises a clamp for the mutual clamping of the end sections of the first and second leaf spring.

Further, the first fastening device can have a mount for a bearing for the pivotable support on a vehicle body or a subframe provided on the vehicle body. In particular relative movements which result due to the desired deformations of the leaf springs can be better compensated by means of such a pivotable support. In addition, constraints can be avoided hereby.

Further, the leaf springs of the spring device can be arranged relative to one another so that the main extension direction of the first leaf spring and the main extension direction of the second leaf spring in the relaxed state of the spring device enclose an acute angle, in particular an acute angle of 15° to 35°. This facilitates a low overall height in the mounting position on the vehicle. In the absence of separate coil springs for supporting the vehicle body, in addition, a particularly large trunk width or cargo space width and a low-lying trunk floor or cargo space floor can be achieved by this means.

The second fastening device can have a bearing mount for the pivotable support on a wheel carrier. In a wheel suspension, vertical and transverse forces are transmitted via this fastening device from the wheel carrier to the first leaf spring. The pivotable linkage avoids constraints and opens up a greater design framework with regard to the attachment of other wheel guiding members between the wheel support and the vehicle body. It is also possible in principle, however, in ensuring suitable elasticities, to attach, for example, to fixedly clamp, the first leaf spring to the wheel carrier in a non-articulated manner.

The third fastening device can have a coupling element for connecting the free end of the second leaf spring from below to a section of the vehicle body. A vertical force can be transmitted from the second leaf spring to the vehicle body via such a coupling element. In addition, a coupling element of this kind enables the compensation of relative movements between the second leaf spring and the vehicle body, which inevitably occur in a desired deformation thereof for suspension purposes.

Further, a motor vehicle wheel suspension is also proposed. This comprises for each wheel side a spring device of the type described above, wherein the first and second leaf springs each extend in the vehicle transverse direction or enclose therewith an angle of at most +/−15° when viewed in a horizontal plane. In the viewing direction of the longitudinal direction of the motor vehicle, this results in an X-shaped spring system whose arms are formed by the total of four leaf springs, in each case two leaf springs per wheel side.

Thus, a particularly light and low-cost axle for a motor vehicle is created. The solution of the invention is particularly suitable for the rear axles of passenger cars and light commercial vehicles, but without being limited thereto.

The second leaf springs can each be supported from below on a longitudinal member of the vehicle body. This makes use of the fact that the longitudinal members of a motor vehicle usually have sufficient stability for supporting vertical forces, so that the use of a leaf spring made of fiber-reinforced plastic at this location requires no additional reinforcing measures, which would increase the overall weight of the vehicle on the body side.

As already indicated above, the spring device of the invention enables a particularly flat axle construction. In particular, in this case, the first leaf springs extend horizontally in the rest position of the vehicle on a horizontal surface or have an angle of maximum +/−10° with a horizontal plane.

Further, the first fastening devices can be arranged in the vehicle transverse direction in a middle region, which is bounded in the vehicle transverse direction by the longitudinal members of the vehicle body. It is possible, for example, to arrange the first fastening devices in the vehicle transverse direction with respect to the vehicle track width in a middle third, in particular middle fifth, about the longitudinal central axis. This enables a particularly long length of the leaf springs and thus a correspondingly high energy absorption capacity, which in turn allows the mass of the vehicle body to be supported solely on the leaf springs, as a result of which coil springs usually provided for this purpose may optionally be completely eliminated.

Each spring device can have a coupling element, which continues said device in the direction of the vehicle center beyond the point of the vehicle-body-side connection of the first fastening device, wherein the coupling members of the spring devices are interconnected by a joint in order to reduce the mutual compression of the spring devices. As a result, the function of a stabilizer can additionally be represented by the spring devices, in particular their first leaf springs.

Further, it is possible to form the respective coupling member as an extension on a first fastening device forming a fixed support for the first and second leaf spring, as a result of which a particularly high functional integration is achieved in a single part.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The first exemplary embodiment shows a spring device 10 for a motor vehicle wheel suspension. Spring device 10 has a first leaf spring 11 and a second leaf spring 12. Both leaf springs 11 and 12 are made of a fiber-reinforced plastic, for example, glass fiber-reinforced plastic (GRP) or carbon fiber-reinforced plastic (CFRP). They can be designed in particular rod-shaped or bar-shaped. Both leaf springs 11 and 12 are implemented as separate parts in the first exemplary embodiment shown in FIG. 1. It is also possible, however, to integrate both leaf springs 11 and 12 in a one-piece body made of fiber-reinforced plastic.

Figure 1:
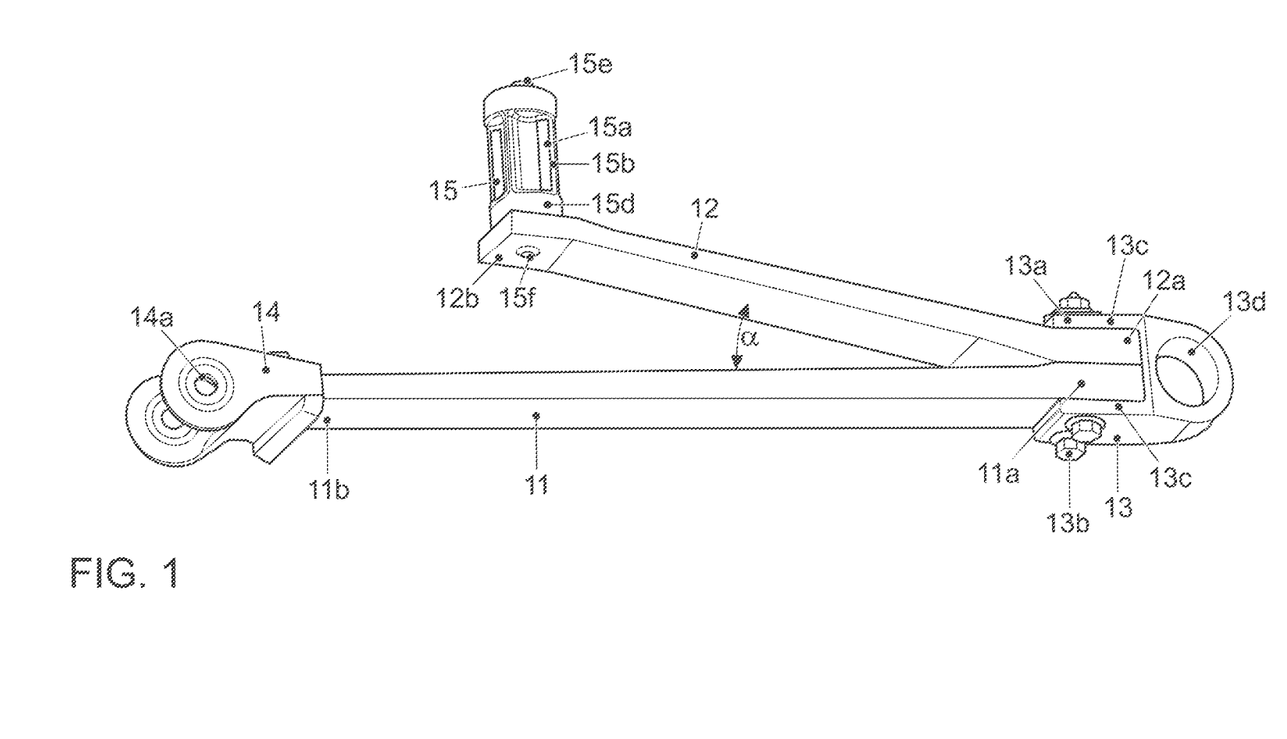
FIG. 1 shows as an exemplary embodiment a spring device according to the invention in a state which corresponds to the mounting position in a motor vehicle in the rest position of the vehicle on a horizontal surface.

As can also be derived from FIG. 1, both leaf springs 11 and 12 have a different length. Thus, first leaf spring 11 has a greater length than second leaf spring 12.

Further, first leaf spring 11 and second leaf spring 12 are arranged in a particular manner spatially to one another, namely in order to together form a resilient V-shaped structure. For this purpose, an end section 11a of first leaf spring 11 and an end section 12a of second leaf spring 12 are in each case joined and connected together to form the tip of the V-shaped structure. The respective opposite end sections 11b and 12b accordingly form the free ends of the V shape. In this case, the free ends and the tip of the V-shaped structure serve as force introduction points into spring device 10.

In regard to a low installation height, the V shape can be designed so that the main extension direction of first leaf spring 11 and the main extension direction of second leaf spring 12 in the relaxed state of spring device 10 enclose an acute angle α. This acute angle α is preferably in the range of 15° to 35°, so that, on the one hand, a low installation height can be ensured and, on the other, a sufficient spring compression potential for energy absorption is available. FIG. 1 shows spring device 10 in a slightly compressed state, which corresponds to the mounting position in the vehicle. The relaxed state substantially corresponds to the rebound state shown in FIG. 2 by dashed lines.

A fastening device is provided in each case correspondingly at the aforementioned force introduction points. A first fastening device 13 is thus located in the region of joined end sections 11a and 12a on the first and second leaf springs 11 and 12. This first fastening device 13 is used in a motor vehicle wheel suspension for vehicle-body-side support. Spring device 10 can thus be supported in the region of the tip of the V-shaped structure on the vehicle body or a structure rigidly fixed to the vehicle body such as, for example, a subframe or the like.

Furthermore, there is a second fastening device 14 at the free end of first leaf spring 11. This second fastening device 14 is used for wheel-side support, for example, on a wheel carrier or a wheel guiding member. Further, a third fastening device 15 is provided at the free end section 12b of second leaf spring 12 for the vehicle-body-side support.

Due to the shorter length of second leaf spring 12, it vehicle-body-side support point at free end section 12b of second leaf spring 12 in an arrangement of spring device 10 in the vehicle transverse direction lies closer to the vehicle center than the wheel-side support point of first leaf spring 11.

First and second leaf springs 11 and 12 can be clamped together directly at their joined end sections 11a and 12a.

In the exemplary embodiment illustrated in FIG. 1, first fastening device 13 has a clamp 13a for mutually clamping end sections 11a and 12a of first and second leaf springs 11 and 12. Further, by means of clamp 13a, a rotational movement of first leaf spring 11, which results from compression and deformation thereof, can be transmitted to second leaf spring 12 and vice versa.

Clamp 13a may be made, for example, as a fork-shaped claw into which end sections 11a and 12a of first and second leaf springs 11 and 12 are inserted. However, the design of clamp 13a is not limited to the shape of such a claw. Rather, other embodiments are also possible here. Clamping can be done as shown by means of clamping bolt 13b. A uniform distribution of the clamping force over the surface of end sections 11a and 12a is achieved via corresponding flange sections 13c of the claw.

In addition, first fastening device 13 of the exemplary embodiment allows a pivotable mounting of spring device 10. For this purpose, first fastening device 13 can, for example, have a mount 13d for a bearing for pivotable support on the vehicle body or a subframe provided on the vehicle body. In the illustrated exemplary embodiment, by way of example a bearing eye is integrated for this purpose into first fastening device 13. However, for example, a bearing bolt or the like can also serve as a mount 13d for a bearing, a pivotable mounting being realizable via the bolt.

Second fastening device 14 can, for example, have a bearing mount 14a for the pivotable support on a wheel carrier. FIG. 1 shows purely by way of example a bearing mount 14a, designed as a fork, via which, for example, a rubber mount can be mounted. As already explained in the context of first fastening device 13, however, other structures such as, for example, a bearing bolt or the like are fundamentally possible as a bearing mount 14a.

In principle, it is possible to attach free end section 12b of second leaf spring 12 directly to a body-side structure. In the simplest case, third fastening device 15 then may be formed only of one or more fastening devices such as clamping bolts and the like. However, an articulated coupling can also be provided at this point to introduce an additional degree of freedom.

Moreover, it is possible, via third fastening device 15, to compensate relative movements vis-à-vis the vehicle body or the structure rigidly fixed to the vehicle body, said movements which can hardly be avoided due to the deformation of second leaf spring 12. In the exemplary embodiment shown in FIG. 1, for this purpose, third fastening device 15 has a coupling element 15a for connecting the free end of second leaf spring 12 from below to a section of the vehicle body.

Coupling element 15a can, for example, have a pressure-resistant and tension-resistant support body 15b which is supported on the vehicle body via a first rubber buffer 15c and on the free end section 12b of second leaf spring 12 via a second rubber buffer 15d. At the axial ends of support body 15b, pins 15e and 15f may be formed, which penetrate the respective rubber buffer 15c and 15d and serve to fix the position of coupling element 15a on second leaf spring 12 and on the vehicle body, where corresponding openings can be provided. Rubber buffers 15c and 15d avoid constraints when second leaf spring 12 is deformed and pivoted, so that the deformation potential of second leaf spring 12 can be utilized well. In addition, noise generation can be counteracted. Alternatively, an additional elasticity can be introduced into the spring system of spring device 10 via support body 15b by forming it as a spring.

Figure 2:
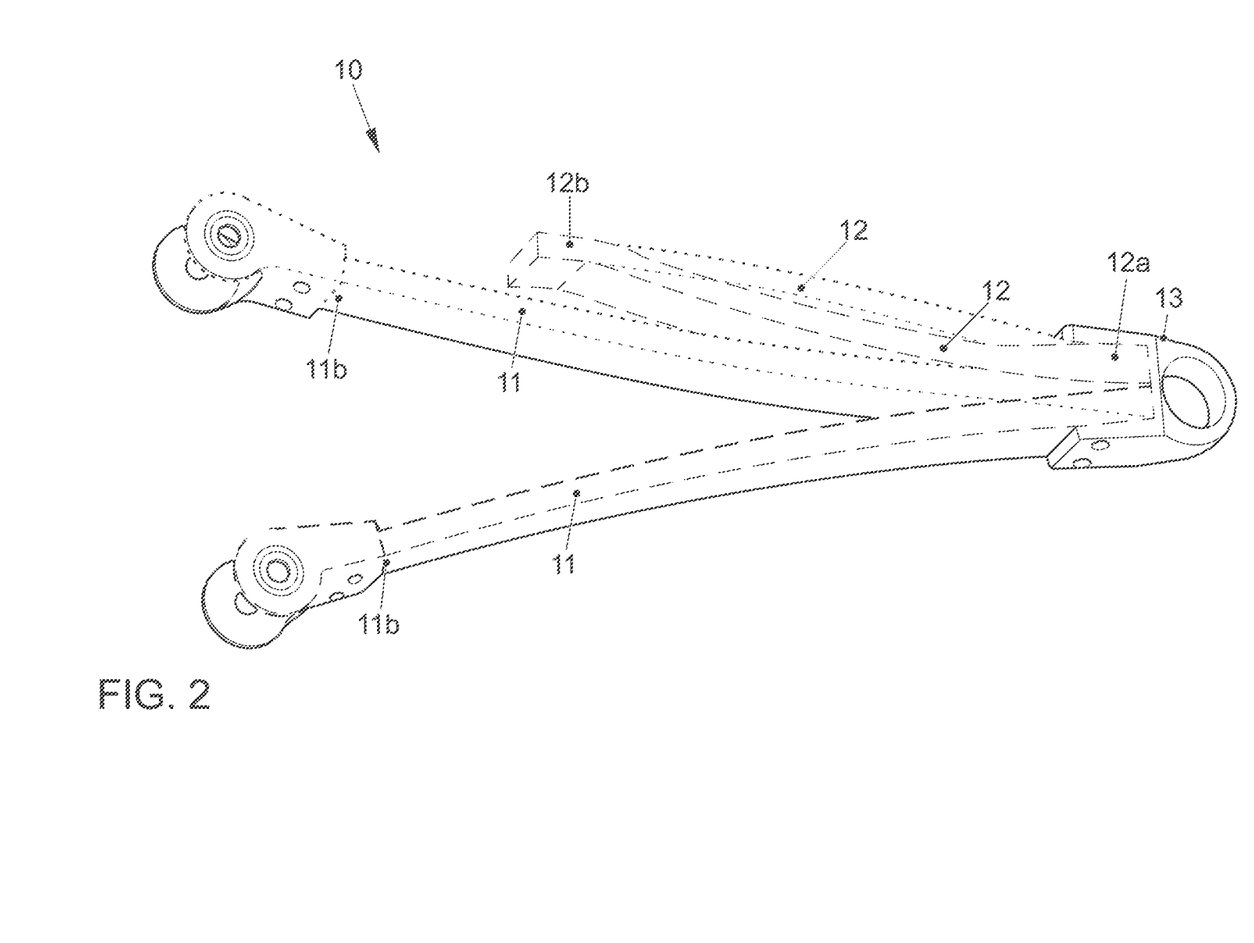
FIG. 2 shows a diagram to illustrate the deformation potential of the spring device according to FIG. 1.

FIG. 2 shows the compression and rebound behavior of spring device 10. In this case, the deformation of leaf springs 11 and 12 is shown with dotted lines in the compressed state and with dashed lines in the rebound state. Because the position of the vehicle-body-side connection points does not change, the positions of end sections 12a and 12b of second leaf spring 12 remain virtually unchanged, apart from a certain compensation of relative displacements in the region of coupling element 15a and a pivoting of first fastening device 13 in the associated bearing. In contrast, free end section 11b of first leaf spring 11 moves considerably with the wheel carrier relative to the vehicle body. The resulting bending deformation of first leaf spring 11 due to the coupling with second leaf spring 12 in the region of first fastening device 13 leads to a deformation of second leaf spring 12 as well, which thus also absorbs suspension energy and supports corresponding reaction forces against the vehicle body via fastening device 15, in the present exemplary embodiment via the coupling element 15a.

The use of such a spring device 10 in a wheel suspension 20 of a motor vehicle will now be explained in greater detail with the aid of FIGS. 3 and 4. A rear axle which has one such spring device 10 per wheel side is shown by way of example in FIGS. 3 and 4.

Wheel suspension 20 comprises per vehicle wheel a wheel carrier 21, which is supported via a plurality of wheel guiding members against vehicle body 40 or a structure rigidly fixed to the vehicle body such as a subframe 41.

The wheel guiding members in the present case comprise per wheel side a trailing arm 22 and an upper control arm 23 and a lower control arm 24.

Furthermore, a vibration damper 25 is indicated, which is supported with one end on wheel carrier 21, possibly also on a wheel guiding member, and with its other end on vehicle body 40.

Wheel suspension 20 further has a stabilizer 26, which reduces a mutual compression of wheel carrier 21 and thus of the vehicle wheels.

The present wheel suspension 20 does not require a coil spring to support the vehicle mass. Its function is taken over here by spring device 10. It is possible, however, in a wheel suspension 20, which includes a spring device 10 of the type described above, to use in addition conventional coil springs to support the vehicle mass.

The illustrated wheel suspension 20 is merely exemplary in nature to explain in greater detail the mounting position of spring device 10 in such a suspension. It must therefore be expressly emphasized that corresponding spring devices 10 can also be used as shown in other wheel suspensions 20, in order to support the mass of the vehicle body against the vehicle wheels and optionally also to assume wheel guiding functions.

Spring device 10 explained above is mounted in wheel suspension 20 such that first and second leaf springs 11 and 12 each extend in the vehicle transverse direction y or enclose an angle of at most +/−15° with the vehicle transverse direction y when viewed in a horizontal plane xy.

First leaf spring 11 thereby lies under second leaf spring 12 in relation to vehicle vertical direction z.

Further, spring device 10 extends very far in the direction of the vehicle center, resulting in a large length with a correspondingly high energy absorption capacity for the first and second leaf springs 11 and 12. Due to the selected V shape, the overall height in vehicle vertical direction z remains low.

In the rest position of the vehicle, first leaf springs 11 extend predominantly horizontally on a horizontal surface; i.e., they enclose an angle of a maximum +/−10° with a horizontal plane xy.

Figure 3:
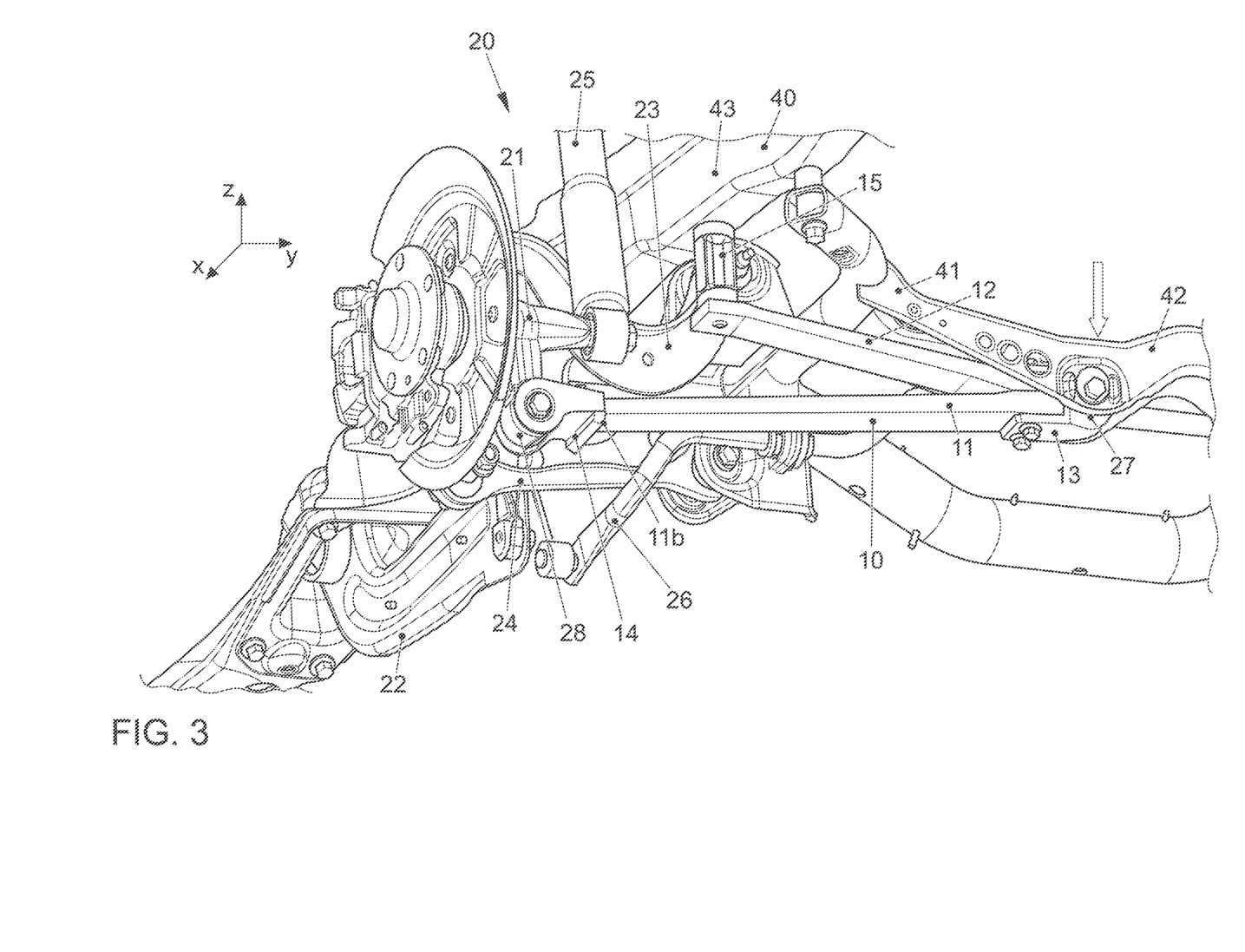
FIG. 3 shows, as an exemplary embodiment, a motor vehicle wheel suspension with a spring device according to FIG. 1 in a position which corresponds to the rest position of a motor vehicle on a horizontal surface.

As shown in FIG. 3, the connection of spring device 10 in the region of the tip of the V shape by means of first fastening device 13 preferably takes place on a cross member 42 of subframe 41. The same applies to the spring device of the opposite wheel side.

In order to realize the greatest possible length of spring device 10 in the vehicle transverse direction y, first fastening devices 13 are arranged in the vehicle transverse direction y relative to the vehicle track width preferably in a middle third and more preferably in a middle fifth about the longitudinal center axis of the vehicle. The connection to subframe 41 takes place here by way of example via a rubber mount 27 in mount 13d of first fastening device 13, so that spring device 10 can pivot about an axis of rotation extending in the vehicle longitudinal direction x.

Furthermore, spring device 10 can be connected pivotally at wheel carrier 21 via a further rubber mount 28. This further rubber mount 28 couples free end section 11b of first leaf spring 11 in an articulated manner to wheel carrier 21, wherein the associated pivot axis of the joint thus formed also extends predominantly in the vehicle longitudinal direction x. It is also possible, however, to take up free end section 11b of first leaf spring 11, for example, in a clamp on wheel carrier 21, i.e., to attach it in a nonarticulated manner.

Finally, spring device 10 is supported by free end section 12b of second leaf spring 12 on vehicle body 40. As a result, the body-side force application is distributed to two places. Such support of second leaf spring 12, for example, as shown in FIG. 3, can take place on a longitudinal member 43 of vehicle body 40. Preferably, the support takes place further from below. As FIG. 3 shows, compensation of relative movements occurring in the intended deformation of second leaf spring 12 can be achieved via the relevant fastening device 15, for example, in the form of a defined deformable coupling element 15a.

First fastening devices 13 of the two spring devices 10 of a motor vehicle axle are arranged in the vehicle transverse direction in a middle region, which is bounded in the vehicle transverse direction by longitudinal members 43 of vehicle body 40.

This results in a flat motor vehicle axle, which allows a low trunk edge or cargo space edge and a large trunk width or cargo space width.

In addition, the weight advantage of leaf springs 11 and 12 made of fiber-reinforced plastic can be practically completely converted into a weight reduction of the vehicle weight, because in the region of the body-side connection of spring devices 10 no weight-increasing reinforcement measures are required, which would adversely affect the weight advantage of spring devices 10 with first and second leaf springs 11 and 12 made of fiber-reinforced plastic.

Figure 4:
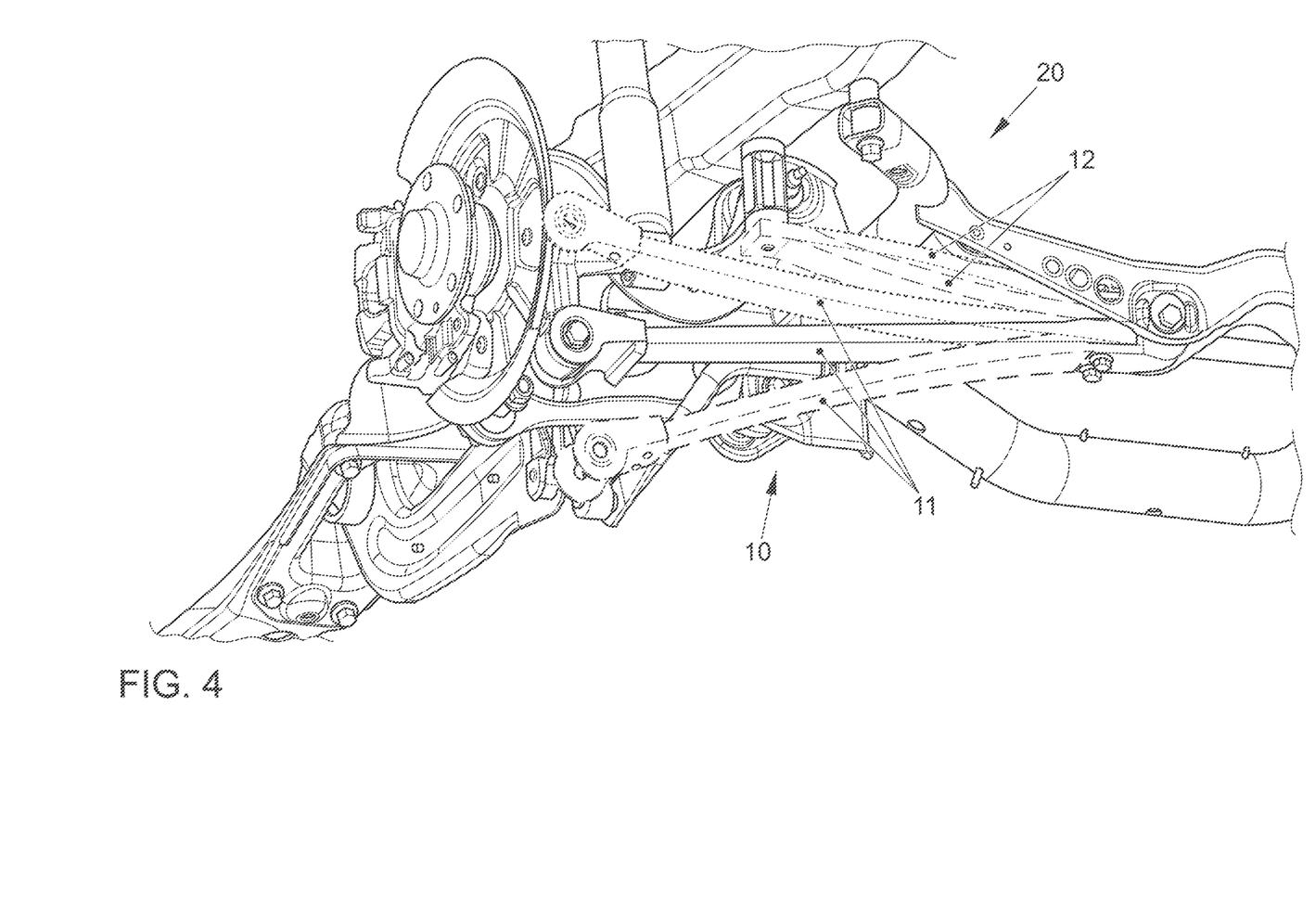
FIG. 4 shows a diagram to illustrate the compression and rebound of the spring device in the motor vehicle wheel suspension according to FIG. 3.

FIG. 4 shows, similar to FIG. 2, the compression and rebounding of spring device 10, wherein the maximum compressed state of spring device 10 is shown by dotted lines and the maximum rebound state of spring device 10 is shown by dashed lines. Wheel carrier 21 is shown here only in the rest position of the vehicle on a horizontal surface.

Finally, a possible variation for mounting spring device 10 in a wheel suspension 20 will be shown on the basis of a third exemplary embodiment with reference to FIGS. 5 to 9. Spring device 10 and wheel suspension 20 of the third exemplary embodiment essentially correspond to the exemplary embodiments already explained above, so that corresponding reference numerals are used in FIGS. 5 to 9. Only the differences from the first and second exemplary embodiments will be discussed below.

The third exemplary embodiment is based on the idea of representing the function of a stabilizer (cf. reference numeral 26 in FIG. 3) by spring devices 10 of the vehicle axle, so that a stabilizer as a separate part can be omitted.

Figure 5:
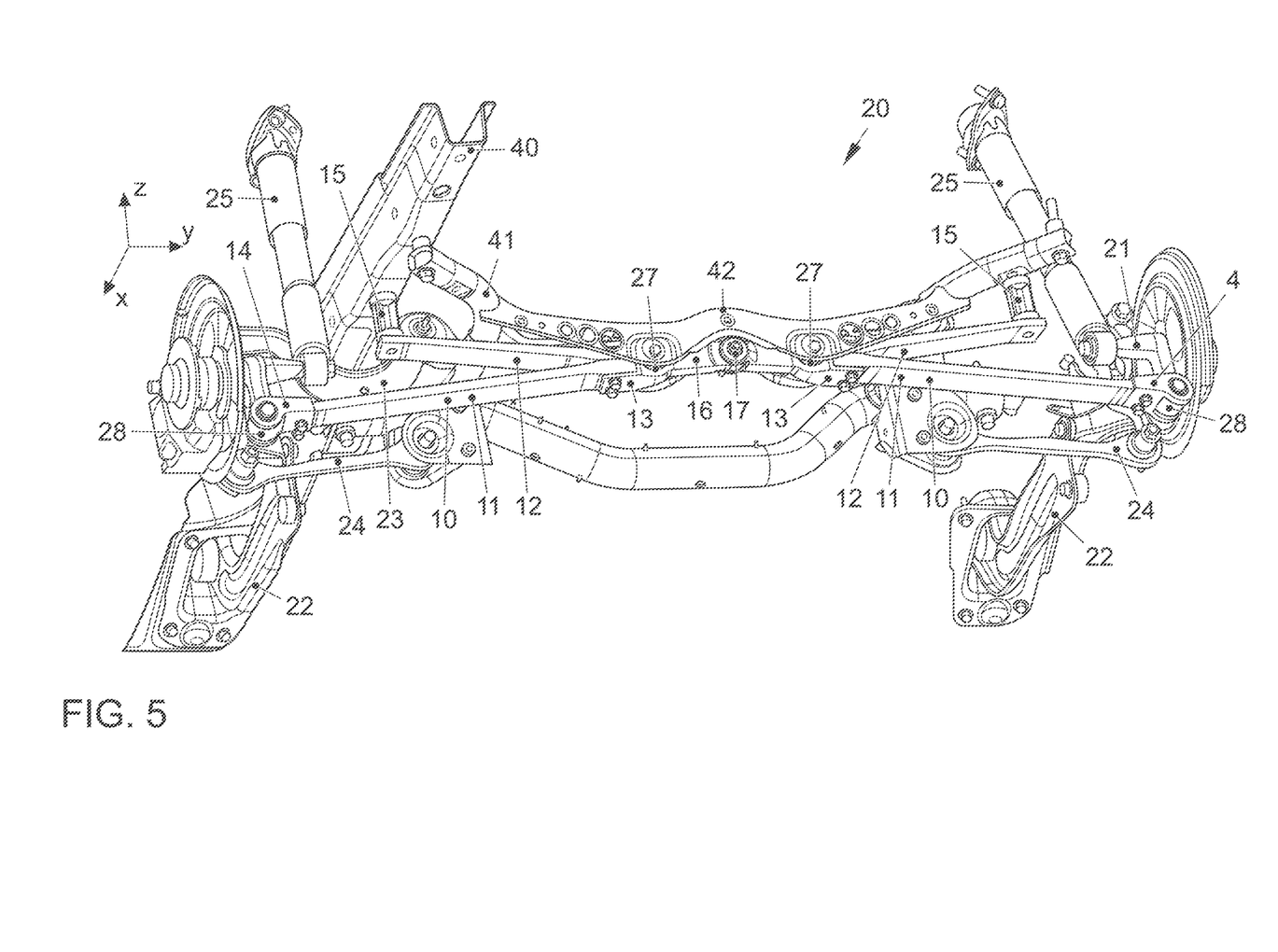
FIG. 5 shows, as an exemplary embodiment, a motor vehicle wheel suspension with coupled spring devices in a position which corresponds to the rest position of a motor vehicle on a horizontal surface.
Figure 6:
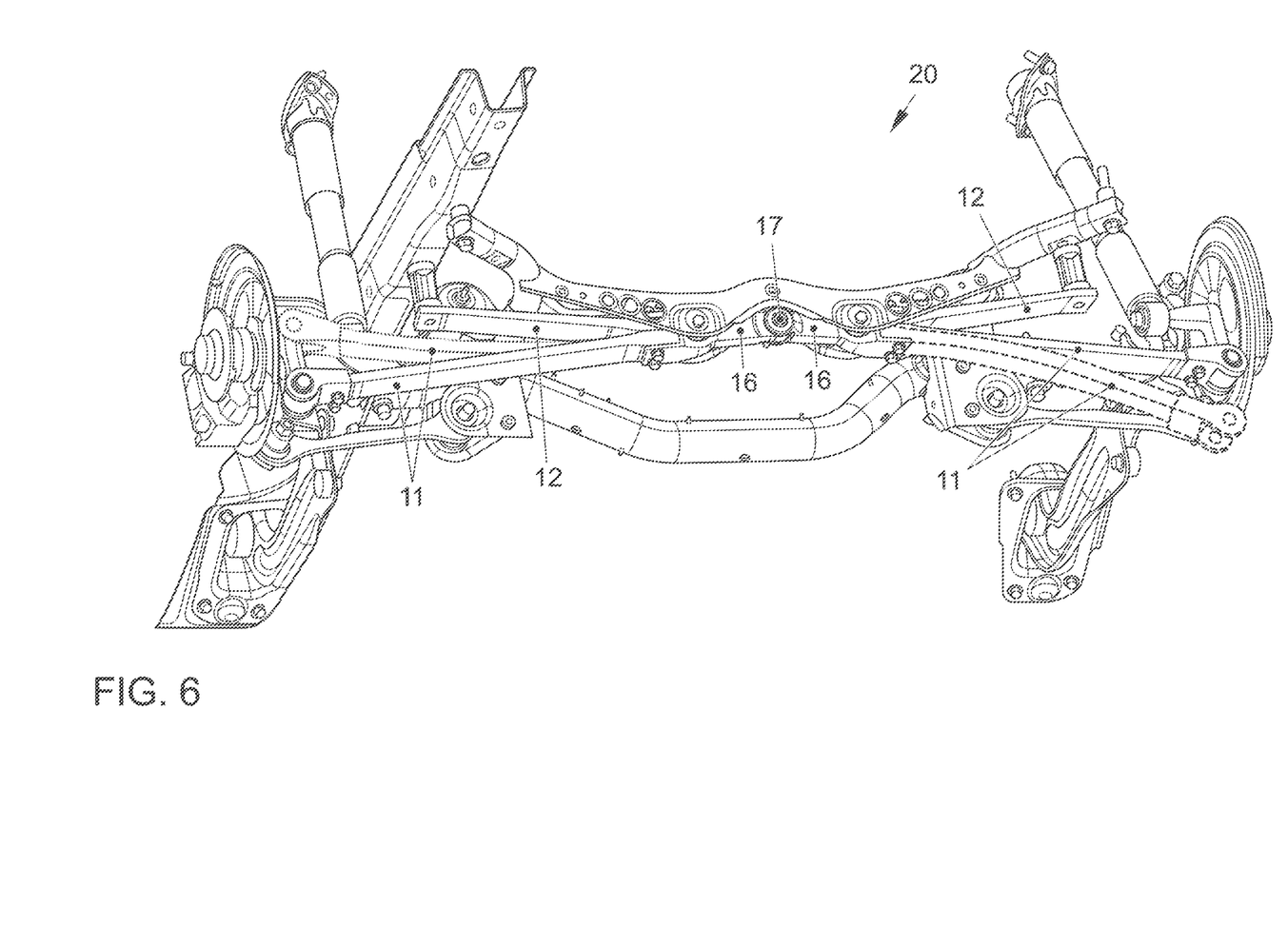
FIG. 6 shows a diagram to illustrate a mutual springing movement of the spring devices in the motor vehicle wheel suspension according to FIG. 5.
Figure 7:
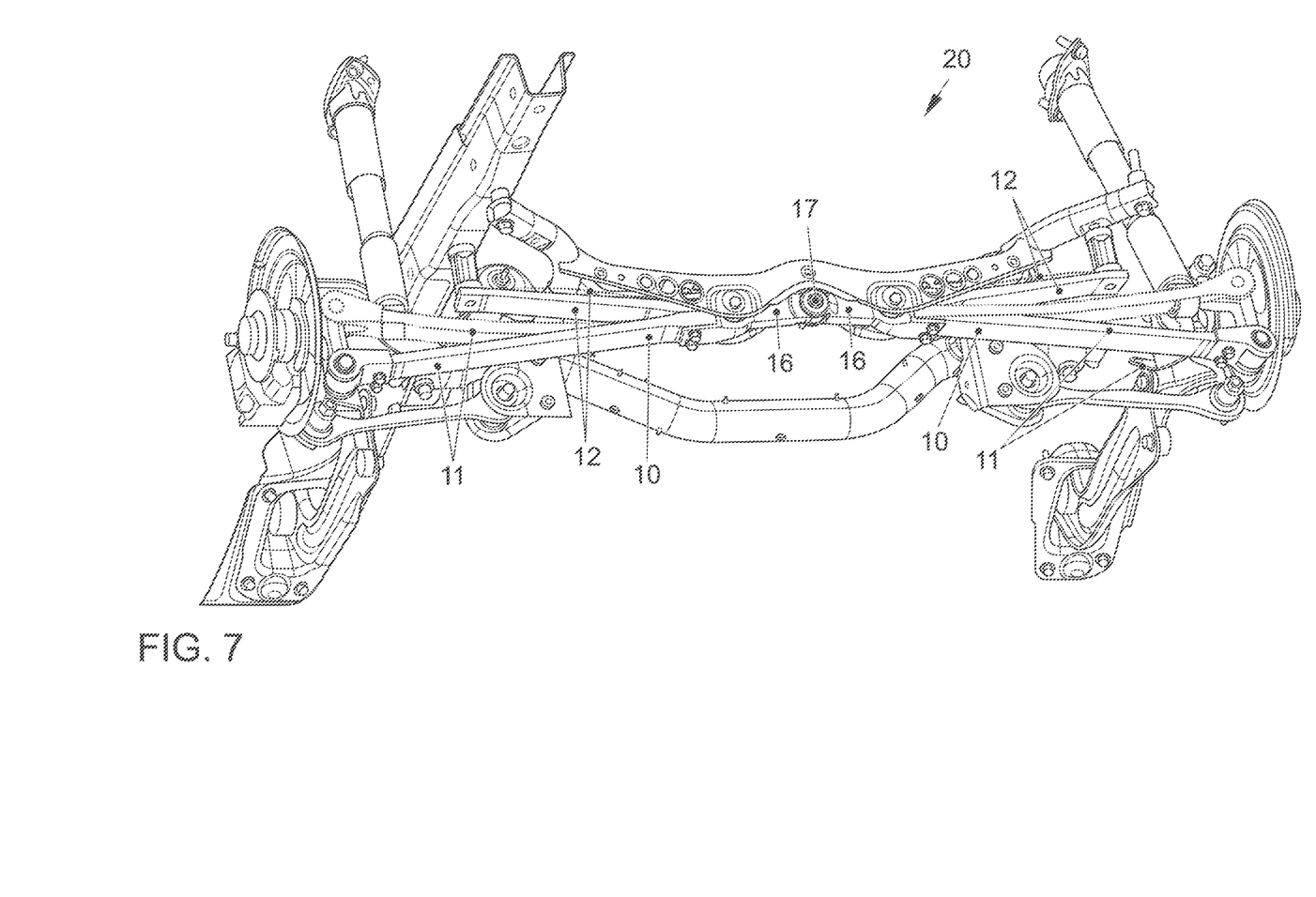
FIG. 7 shows a diagram to illustrate compression of the spring devices on both sides in the motor vehicle wheel suspension according to FIG. 5.

For this purpose, each spring device 10 has a coupling element 16 which continues spring device 10 in the direction of the vehicle center beyond the body-side connection of first fastening device 13. Coupling members 16 of spring devices 10 of both wheel sides are connected to one another by a joint 17. In this case, joint 17 has a pivot axis which extends in the vehicle longitudinal direction x. A mutual compression of spring devices 10 and in particular their first leaf springs 11, as shown in FIG. 6, is reduced by this coupling or the particular total spring rate is increased, because in this case coupling members 16 of the two spring devices 10 tend to move in the opposite direction. In a compression on both sides, as shown in FIG. 7, coupling members 16 in contrast move in the same direction. The total spring rate is then lower than with the mutual compression.

Figure 8:
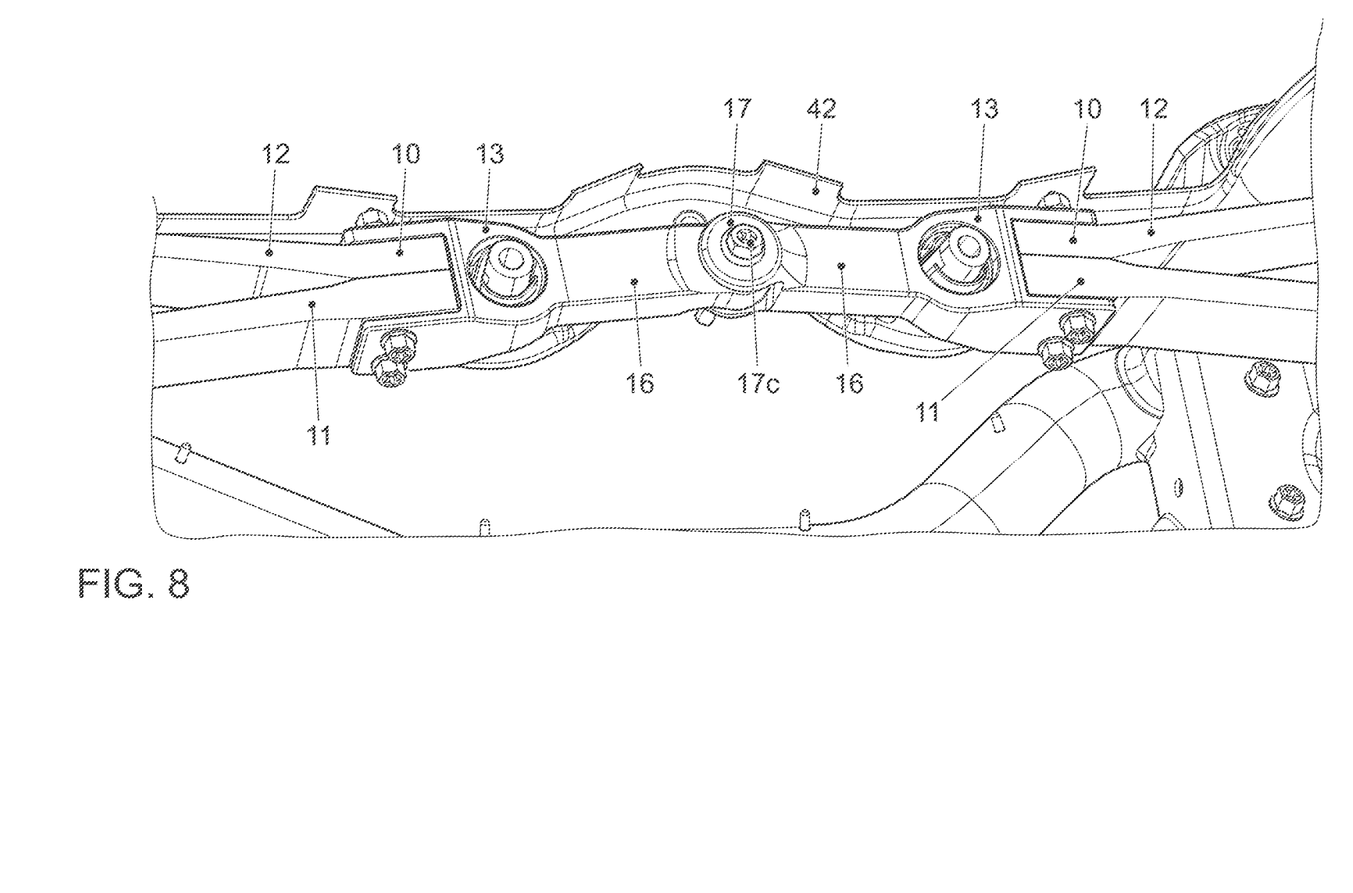
FIG. 8 shows a detail view of the coupling of the spring devices.
Figure 9:
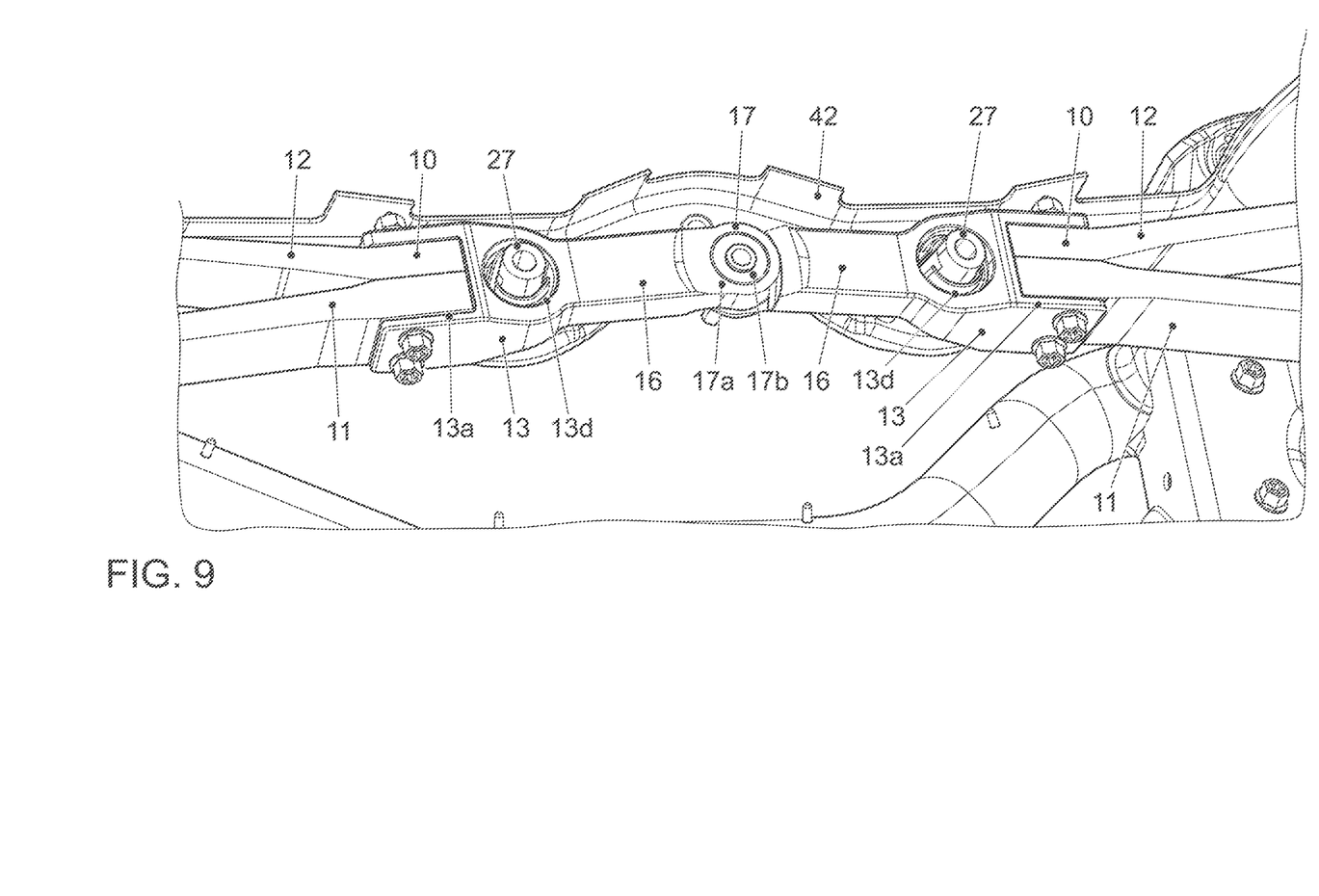
FIG. 9 is a further detail view of the coupling of the spring devices, with a cutaway view of the bearing mount.

Coupling members 16 and their connection via joint 17 are shown in greater detail in FIGS. 8 and 9. Thus, coupling members 16 can each be formed as an extension of first fastening device 13 of the respective spring device 10, which in the present case comprises clamp 13a and bearing mount 13d, as a result of which a component with high functional integration is formed, which is preferably made of a metallic material. It is also possible, however, to continue each leaf spring 11 and 12 beyond the point of the body-side connection in the direction of the vehicle center and to connect together the corresponding components made of fiber-reinforced plastic via a joint 17.

In the present case, joint 17 is formed by a joint eye 17a, formed on a coupling element 16, and a pin 17b formed on the other coupling element 16. Both joint components are secured to one another by a bolt 17c in the direction of the pivot axis of joint 17. Joint 17 explained above is merely exemplary in nature. Instead of joint 17 shown in FIGS. 8 and 9, other joints may also be used which allow a pivotable coupling of coupling members 16 of both wheel sides in the middle of the vehicle.

The function of a stabilizer can be achieved by coupling spring devices 10 of a motor vehicle axle, because in a mutual compression the spring system of coupled spring devices 10 becomes rigid. A separate stabilizer is thus unnecessary.

The invention has been explained in greater detail above with reference to exemplary embodiments and further modifications. The exemplary embodiments and modifications serve to prove the enablement of the invention. Individual technical features, which have been explained above in the context of further individual features, can also be implemented independently of these and in combination with other individual features, even if this is not expressly described, as long as this is technically possible.

The invention is therefore expressly not limited to the specifically described exemplary embodiments but comprises all embodiments defined by the claims.

The invention being thus described, it will be obvious that the same may be varied in many ways.

Such variations are not to be regarded as a departure from the spirit and scope of the invention, and all such modifications as would be obvious to one skilled in the art are to be included within the scope of the following claims:

1. A motor vehicle wheel suspension comprising:
a spring device provided on each respective wheel side of the motor vehicle, the spring device comprising:
a first leaf spring made of fiber-reinforced plastic; and
a second leaf spring made of fiber-reinforced plastic, which is shorter than the first leaf spring and together with the first leaf spring forms a V-shaped structure, which, in a region of joined ends, has a first fastening device for a vehicle-body-side support and at a free end of the first leaf spring, a second fastening device is provided for wheel-side support and at a free end of the second leaf spring, a third fastening device is provided for vehicle-body-side support,
wherein, on each wheel side, the first and second leaf springs each extend in a vehicle transverse direction or extend at an angle of at most +/−15° from the vehicle transverse direction when viewed in a horizontal plane, and
wherein the spring device provided on each wheel side has a coupling member that extends from the vehicle-body-side connection of the first fastening device in the direction of the vehicle center, such that the coupling member provides an extension of a length of the spring device in the direction of the vehicle center, wherein the coupling member of each wheel side are interconnected to one another at the vehicle center by a joint to reduce the mutual compression of the spring devices.

2. The motor vehicle wheel suspension according to claim 1, wherein the first fastening device has a clamp for mutual clamping of the joined ends of the first and second leaf spring.

3. The motor vehicle wheel suspension according to claim 2, wherein the first fastening device has a mount for a bearing for a pivotal support on a vehicle body or a structure rigidly fixed to the vehicle body.

4. The motor vehicle wheel suspension according to claim 3, wherein the clamp is provided at a first end of the first fastening device and the coupling member is provided at a second end of the first fastening device, such that the mount of the first fastening device is provided between the clamp and the coupling member, wherein the coupling member is a shaft that extends from the second end of the first fastening device toward the vehicle center, the shaft being monolithic with the first fastening device.

5. The motor vehicle wheel suspension according to claim 4, wherein a distal end of the coupling member of each wheel side are interconnected to one another at the joint by a bolt, the bolt directly contacting the distal end of the coupling member of each wheel side.

6. The motor vehicle wheel suspension according to claim 1, wherein the second fastening device has a bearing mount for a pivotable support on a wheel carrier.

7. The motor vehicle wheel suspension according to claim 6, wherein the third fastening device has a coupling element for connecting the free end of the second leaf spring from below to a section of the vehicle body.

8. The motor vehicle wheel suspension according to claim 1, wherein the second leaf spring, on each wheel side, are each supported from below on a longitudinal member of the vehicle body.

9. The motor vehicle wheel suspension according to claim 1, wherein the first leaf spring extends in the vehicle transverse direction along a horizontal plane in a rest position of the vehicle or extends at an angle of a maximum +/−10° with the horizontal plane.

10. The motor vehicle wheel suspension according to claim 1, wherein the first fastening device is arranged in the vehicle transverse direction in a middle region, which is bounded in the vehicle transverse direction by longitudinal members of the vehicle body.

11. The motor vehicle wheel suspension according to claim 1, wherein the coupling member is formed as an integral extension of the first fastening device.

12. The motor vehicle wheel suspension according to claim 1, wherein a main extension direction of the first leaf spring and a main extension direction of the second leaf spring, in a relaxed state of the spring device, enclose an acute angle of 15° to 35°.

* * * * *